(No Model.) 2 Sheets—Sheet 1.

J. W. SARGENT.
STEAM ENGINE VALVE GEAR.

No. 485,433. Patented Nov. 1, 1892.

Witnesses
Jno. G. Hickel
Wm. E. Neff

Inventor
John W. Sargent
By J. A. Watson
Attorney

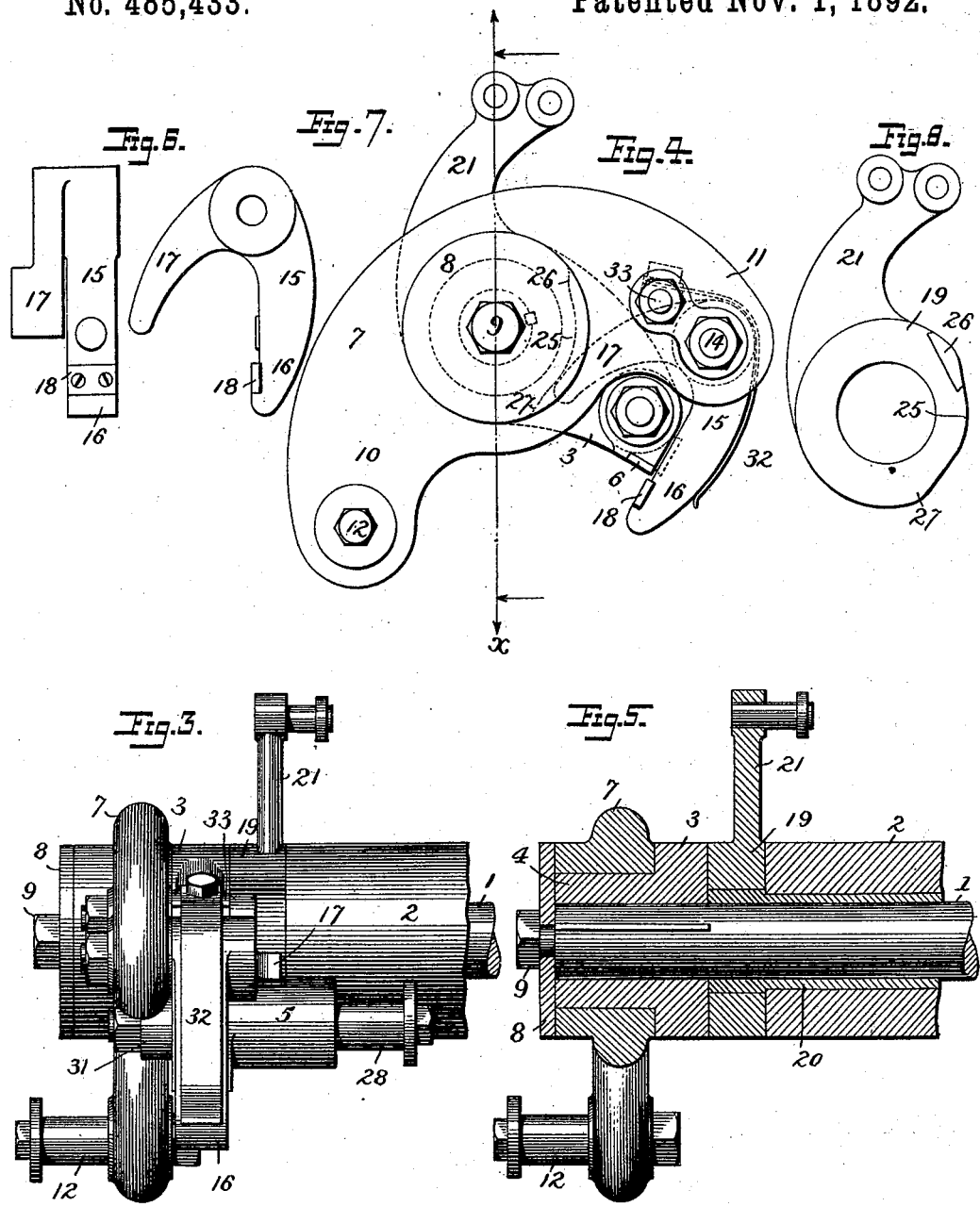

UNITED STATES PATENT OFFICE.

JOHN W. SARGENT, OF SCRANTON, PENNSYLVANIA.

STEAM-ENGINE VALVE-GEAR.

SPECIFICATION forming part of Letters Patent No. 485,433, dated November 1, 1892.

Application filed April 8, 1892. Serial No. 428,381. (No model.)

*To all whom it may concern:*

Be it known that I, JOHN W. SARGENT, a citizen of the United States, residing at Scranton, in the county of Lackawanna and State of Pennsylvania, have invented certain new and useful Improvements in Steam-Engine Valve-Gear, of which the following is a specification.

My invention relates to automatic cut-off valve gear of the "Corliss" type; and it consists in certain improvements in the construction and relation of the parts which effect the movements of the inlet-valves.

Figure 1:
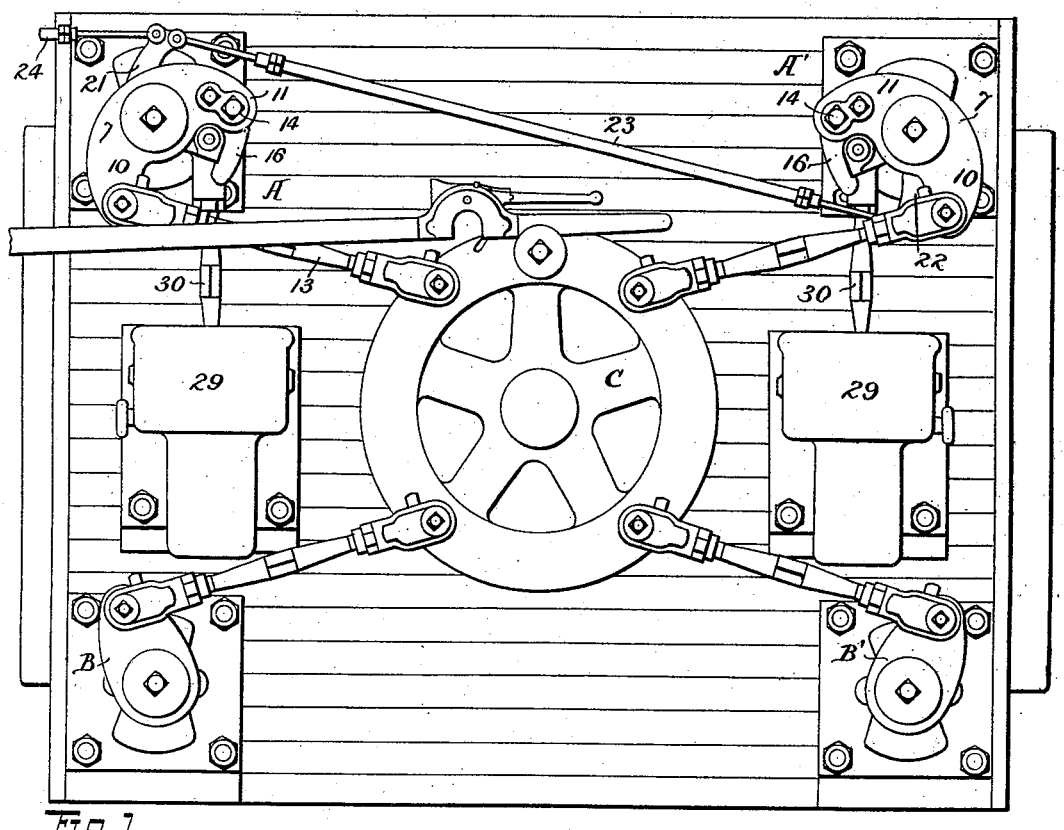
Figure 2:
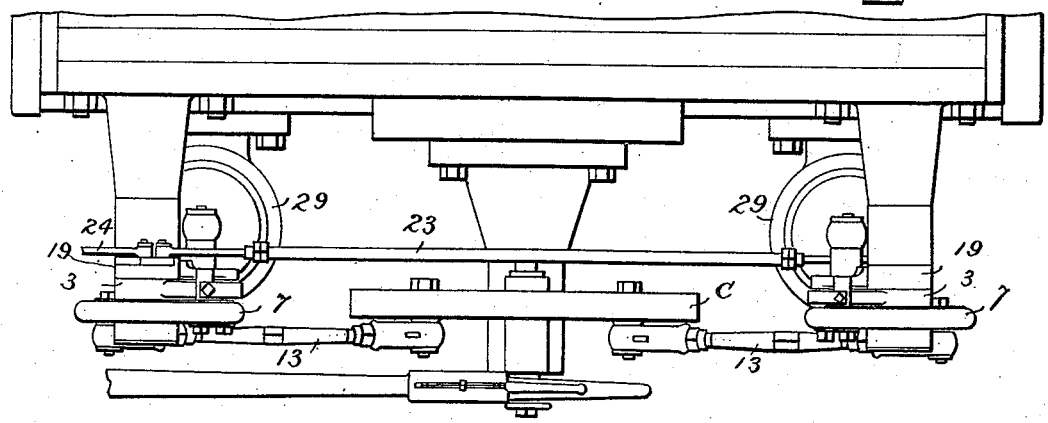

In the accompanying drawings, in which like reference-signs refer to similar parts throughout the several views, Figure 1 is a front elevation of the cylinder and steam-chest of an engine, showing the valve-operating devices. Fig. 2 is a plan view of said devices, part of the cylinder being broken away. Fig. 3 is a side view of the mechanism for operating one of the inlet-valves. Fig. 4 is a front view of the same, and Fig. 5 is a section of the line X X of Fig. 4. Figs. 6 and 7 are side and end views of latch-link, and Fig. 8 is a side view of the trip-collar.

The engine to which my improvements relate has two rotary inlet-valves of ordinary construction, which are provided with valve-operating mechanisms A A', respectively. These mechanisms are connected with the usual wrist-plate C, as are also the levers B B' for operating the exhaust-valves.

In describing my improvements I shall illustrate and dwell particularly upon the mechanism A for operating the inlet-valve next to the governor and driving-shaft, it being understood that the mechanism A' of the other inlet-valve is practically the same, the only difference being that the parts are reversed for convenience.

Figs. 3, 4, and 5 are views of the valve-operating mechanism A, the same reference signs, however, referring to like parts of the mechanism A'. The valve-stem 1 is journaled in the bonnet 2 of the steam-chest and is actuated by a driving-arm 3, which is keyed upon the projecting end of the valve-stem. The driving-arm proper is situated close to the end of the bonnet or a bushing of the bonnet, and it is provided with an elongated hub 4, extending outwardly to the end of the valve-stem. At the outer end of the arm is a boss 5, extending inwardly toward the steam-chest past the end of the bonnet. Upon the front side of the arm opposite the boss 5 is a projection or shoulder 31 for a purpose to be hereinafter described. Upon the outer end of the arm is also fastened a hardened-steel latch-piece 6. The elongated hub 4 of the driving-arm serves as the bearing for a crescent-shaped rocker 7, which, as shown, is held in place by a circular plate or washer 8, the latter being secured to the valve-spindle by a screw-bolt 9, passing through its center. The rocker 7 has two arms 10 and 11, the arm 10 having upon the front side of its outer end a pin 12, to which is attached a link 13, connecting to the wrist-plate. Upon the rear side of the opposite arm 11 is a pin 14, upon which is mounted a latch-link 15. The latch-link 15 has two arms 16 17. The arm 16 lies in the plane of the driving-arm 3 and is provided with a hardened-steel latch-piece 18, which at proper times engages with the latch-piece upon the driving-arm to operate the latter. The shorter arm 17 is offset from the arm 16 and lies in the plane of and engages with a trip-collar 19. A plate-spring 32 is rigidly attached to a stud 33 upon the arm 11 of the rocker and bears upon the arm 16 of the latch-link, giving the latter a tendency to engage with the latch-piece of the driving-arm. The outer end of the bonnet 2 is provided with a bushing 20, in which the valve-spindle turns, and which also forms a bearing for the trip-collar. The trip-collar is free to rock upon this bearing, but is prevented from moving lengthwise thereon by the driving-arm upon one side and the end of the bonnet upon the other. The trip-collar of the mechanism A is provided with an arm 21, extending upwardly, and the trip-collar of the mechanism A' is provided with a similar arm 22, extending downwardly. The arms 21 and 22 are connected by a diagonal link 23, and the arm 21 is also connected with the governor through a link 24. The trip-collars are thus controlled by the governor and moved simultaneously. Each of the trip-collars has a circular peripheral surface 25, around which the offset arm 17 of the latch-link moves when the latch is in engagement with the driving-arm, and cam-shaped projections or trips 26 and 27. The projection 26 is the "cut-off" trip and it operates to disengage the latch-link from the driving-arm to permit the valve to close at the proper time. The "stop-motion" trip 27 is at the opposite end of the circular portion 25 and it operates in the usual manner to prevent the valve being opened when for any reason the governor is accidentally stopped while the engine is running. In stopping and starting the engine the governor is prevented by suitable arrangements (not shown) from dropping to its lowest position, and the stop-motion trip is thereby prevented from engaging with the latch-link.

In the boss 5 is fixed a pin 28, which is connected to the dash-pot 29 by a link 30. The dash-pots 29 are bolted to the front of the cylinder.

The operation will be evident to those familiar with this class of machinery from the preceding description. When the lower end of the rocker is drawn to the right, as shown in Fig. 4, by the wrist-plate, the latch-link engages with the driving-arm, rotating the latter, and thus opening the valve. It will be observed that during this movement the rocker and the driving-arm move together and there is no friction between them. At a certain point in the travel of the rocker the arm 17 comes in contact with the cut-off trip 26, thus rotating the latch-link and immediately releasing the driving-arm. When the driving-arm is released, the valve is instantly closed by suitable means—such as a spring or vacuum—in connection with the dash-pot. Should the means for closing the valve fail to operate, it would be positively closed by the engagement of the rocker upon its return motion with the shoulder 31 upon the driving-arm. The point of cut-off is varied and controlled by the governor and trip-collars and their connections.

Among the advantages of my improved construction, it may be stated that the rocker is in front and pivoted on the hub of driving-arm or directly on valve-stem, and moves with those parts as one when at work, whereas in the usual construction the rocker is in the rear of the driving-arm and pivoted on the bonnet or on a stationary bushing in the same, thus making an extra journal, which when the rocker is at work has a pressure on it of twice the pull of the wrist-plate link; secondly, the rocker being in front, it is thereby more easily removed, and the wrist-plate link as arranged in front of both rocker and wrist-plate is thereby more easily removed and more accessible; thirdly, by placing driving-arm in the rear instead of in front, as in the usual construction, and having the boss for pin and link connecting to dash-pot project backward toward the cylinder, the dash-pot is thereby brought inward toward the cylinder, making it practicable, if preferred, to have it supported directly on the side of the cylinder in the rear of the rockers and links, thus getting the dash-pot up nearer its work and in an accessible place; fourthly, having the dash-pot connection in the extreme rear of valve-gear brings the pull of same directly alongside of the bearing of valve-stem in bonnet, thus avoiding a considerable overhung strain on the bearing in the bonnet, as occurs in the usual construction, and, fifthly, the arrangement is more compact by having the rocker-hub surround the hub of driving-arm, thereby shortening the valve-gear the length of one of the hubs. If preferred, however, the hub of the driving-arm may be made shorter than is shown at its outer end and the rocker pivoted directly on the valve-stem.

Without limiting myself to the precise construction and arrangement of parts shown and described, I claim—

1. In automatic cut-off-valve gear, the combination, with the bonnet and the valve-spindle projecting from the bonnet, of a driving-arm having a laterally-extending hub keyed to the valve-spindle, a rocker journaled upon the said hub and provided with a latch-link, and a trip-collar journaled upon the bonnet, substantially as described.

2. In automatic cut-off-valve gear, the combination, with the bonnet and the valve-spindle projecting from the bonnet, of a driving-arm adjacent to the end of the bonnet and provided with a hub extending laterally in front of the arm, a rocker journaled upon said hub and retained thereon by suitable means, and a trip-collar journaled upon the bonnet in the rear of the driving-arm, substantially as described.

3. In automatic cut-off-valve gear, the combination, with the bonnet and the valve-spindle projecting from the bonnet, of a trip-collar journaled upon the end of the bonnet, a driving-arm keyed to the spindle adjacent to the bonnet and provided at its outer end with a boss or arm extending rearwardly past the trip-collar and connected to the dash-pot, and a rocker in front of the driving-arm, said rocker being connected with the wrist-plate and provided with a latch-link having one arm in the plane of the driving-arm and a second offset arm in the plane of the trip-collar, substantially as described.

4. In automatic cut-off-valve gear, the combination, with the bonnet and valve-spindle, of a driving-arm keyed to the spindle adjacent to the bonnet, said arm having a laterally-extending hub and at its outer end a shoulder 31 upon the forward side and a boss 5 upon the opposite side, a rocker journaled upon the hub in position to engage the shoulder 31, said rocker being provided with a latch-link having arms 16 and 17 for engagement, respectively, with the driving-arm and the trip-collar, and a trip-collar journaled upon the bonnet at the rear of the driving-arm, substantially as described.

In testimony whereof I affix my signature in presence of two witnesses.

JOHN W. SARGENT.

Witnesses;
SILAS WALTER,
MILTON W. LOWRY.